United States Patent
Day, II et al.

(10) Patent No.: US 9,432,493 B2
(45) Date of Patent: Aug. 30, 2016

(54) METHOD AND APPARATUS FOR DETECTING MISSING MICRO-FILTER

(71) Applicant: IKANOS COMMUNICATIONS, INC., Fremont, CA (US)

(72) Inventors: Robert Allen Day, II, Jacksonville, NJ (US); Mehdi Ashari, Holmdel, NJ (US); Vipin Pathak, Eatontown, NJ (US); Amitkumar Mahadevan, Edison, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/703,456

(22) Filed: May 4, 2015

(65) Prior Publication Data

US 2015/0319276 A1   Nov. 5, 2015

Related U.S. Application Data

(60) Provisional application No. 61/987,880, filed on May 2, 2014.

(51) Int. Cl.
*H04M 1/24* (2006.01)
*H04M 3/22* (2006.01)
(Continued)

(52) U.S. Cl.
CPC ............. *H04M 1/24* (2013.01); *H04M 11/06* (2013.01); *H04M 11/062* (2013.01)

(58) Field of Classification Search
CPC ............. H04M 11/062; H04M 3/306; H04M 3/2209; H04M 3/301; H04M 3/305; H04M 3/308; H04M 11/066

USPC ................... 379/1.03, 1.04, 22, 24, 27.01
See application file for complete search history.

(56) References Cited

U.S. PATENT DOCUMENTS 7,519,110 B2 * 4/2009 Shrikhande ........... H04M 3/306
                                                    370/242
2004/0062361 A1   4/2004 Kamali et al.
(Continued)

FOREIGN PATENT DOCUMENTS

EP              2250801 A1   11/2010
WO    WO2009/097243 A1    8/2009
(Continued)

OTHER PUBLICATIONS

International Search Report and Written Opinion Issued Aug. 19, 2015 for PCT/US2015/029079.

*Primary Examiner* — Quoc D Tran
(74) *Attorney, Agent, or Firm* — Holland & Hart LLP

(57) ABSTRACT

The present invention provides a method and apparatus to detect a missing micro-filter. In embodiments, the detection is performed by measuring the distortion caused by an unfiltered telephone device using a SELT (Single Ended Line Test) technique. According to certain aspects, the signal used to perform the distortion measurement is designed such that it causes minimal impact on vectored lines within the same cable. Embodiments of the invention first determines the estimated loop length, then uses the loop length to select a set of signal parameters that will be used to perform the distortion measurement. The parameters to be selected include transmit frequency band and PSD level. According to further aspects, embodiments of the invention include automatically running a missing filter test immediately following a line drop to determine if the line drop was caused by a missing micro-filter.

13 Claims, 12 Drawing Sheets

(51) Int. Cl.
*H04M 3/08* (2006.01)
*H04M 11/06* (2006.01)

(56) References Cited

U.S. PATENT DOCUMENTS

| | | |
|---|---|---|
| 2006/0159162 A1 | 7/2006 | Shrikhande et al. |
| 2006/0268733 A1* | 11/2006 | Rhee ............... H04L 41/082 370/252 |
| 2011/0188640 A1 | 8/2011 | Cioffi et al. |
| 2011/0261932 A1* | 10/2011 | Berg ............... H04B 3/46 379/32.04 |
| 2012/0307983 A1* | 12/2012 | Faulkner ........... H04B 3/46 379/29.03 |
| 2014/0126705 A1* | 5/2014 | Levonas ............ H04M 11/062 379/1.03 |
| 2015/0030059 A1* | 1/2015 | Kalavai ............ H04M 11/062 375/224 |
| 2015/0163349 A1* | 6/2015 | Ardestani ........... H04B 3/46 379/22.02 |
| 2015/0189075 A1* | 7/2015 | Hwang ............. H04M 3/30 379/1.03 |

FOREIGN PATENT DOCUMENTS

| | | |
|---|---|---|
| WO | WO2013-137850 A1 | 9/2013 |
| WO | WO2013-154569 A1 | 10/2013 |

* cited by examiner

METHOD AND APPARATUS FOR DETECTING MISSING MICRO-FILTER

CROSS-REFERENCE TO RELATED APPLICATIONS

The present application claims priority to U.S. Prov. Appln. No. 61/987,880 filed May 2, 2014, the contents of which are incorporated by reference herein in their entirety.

FIELD OF THE INVENTION

The present invention relates to xDSL communications, and more particularly to a method and apparatus for detecting a missing micro-filter at a customer premises in a xDSL communication system.

BACKGROUND OF THE INVENTION

There are two types of xDSL (i.e. ADSL, VDSL, etc.) installations that are typically employed at a customer premises. In one, the telephone line connects to a splitter as the line enters the house. Leaving the splitter are two lines, one of which connects to the xDSL modem, the other of which connects to all of the telephone devices in the house, typically using the existing in-home wiring. The splitter separates the low frequency voice band telephone signal from the higher frequency xDSL signal.

In the other typical type of deployment, a splitter is not used. Instead, the combined voice band and xDSL signals are routed throughout the house over the existing telephone wiring. The signals are able to share the same wiring due to the use of different frequency bands. In this case, a filter, known as a micro-filter or a micro-data filter, is connected in-line with each telephone device.

The problem of xDSL performance being degraded by a missing micro-filter is a long standing problem that has been around since the early days of ADSL and continues with VDSL. In splitter-less installations, it's possible that the xDSL modem can be installed by the user. In these cases, the user must also properly connect a micro-filter in-line with each telephone device which is connected to the same telephone line within the building. This must be done not only for each actual telephone, but also any device that connects to the telephone line such as an analog modem, fax machine, or alarm system. It is quite common for the user to fail to connect a micro-filter to one or more of these devices and to be unaware that they have failed to do so.

When the micro-filter is not installed it causes several problems. When the unfiltered xDSL signal reaches the telephone device the total voltage of the broadband signal can be greater than that of a narrow band voice signal, so that the voltage exceeds the design limits of the phone's line interface circuitry. This can cause distortion. This distortion impacts the modem's performance by lowering the data rate (i.e. capacity).

Another problem is that an unfiltered phone affects the impedance seen by the modem. Worse yet, when the phone's hook status changes (on-to-off or off-to-on), the impedance changes. This modifies the echo seen by the modem's receiver and can cause the line to drop when the modem is in Showtime.

Yet another problem associated with missing micro-filters is that for most types of phones, the amount of distortion generated depends on whether the telephone device is on-hook or off-hook. The problem is that at the time a Single Ended Line Test (SELT) is performed, a phone which has a missing micro-filter might not be in its highest distortion state and therefore the distortion might not be detectable.

What is needed, therefore, is a means of detecting a missing micro-filter that addresses these and other problems.

SUMMARY OF THE INVENTION

The present invention provides a method and apparatus to detect a missing micro-filter. In embodiments, the detection is performed by measuring the distortion caused by an unfiltered telephone device using a SELT technique. According to certain aspects, the signal used to perform the distortion measurement is designed such that it causes minimal impact on vectored lines within the same cable. So the proper choice of signal parameters to ensure minimal disturbance of vectored lines depends on the loop length. Accordingly, embodiments of the invention first determine the estimated loop length, then use the loop length to select a set of signal parameters that will be used to perform the distortion measurement. The parameters to be selected include transmit frequency band and PSD level. According to further aspects, embodiments of the invention include automatically running a missing micro-filter test immediately following a line drop to determine if the line drop was caused by a missing micro-filter.

In accordance with these and other aspects, a method to detect a missing micro-data filter according to embodiments of the invention includes selecting a probe signal having a transmit signal band and a separate monitor band; performing a single-ended line test (SELT) by transmitting the probe signal on a line and simultaneously measuring a reflection of the transmitted probe signal; calculating distortion in the monitor band; and declaring a missing micro-filter based on the calculated distortion.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
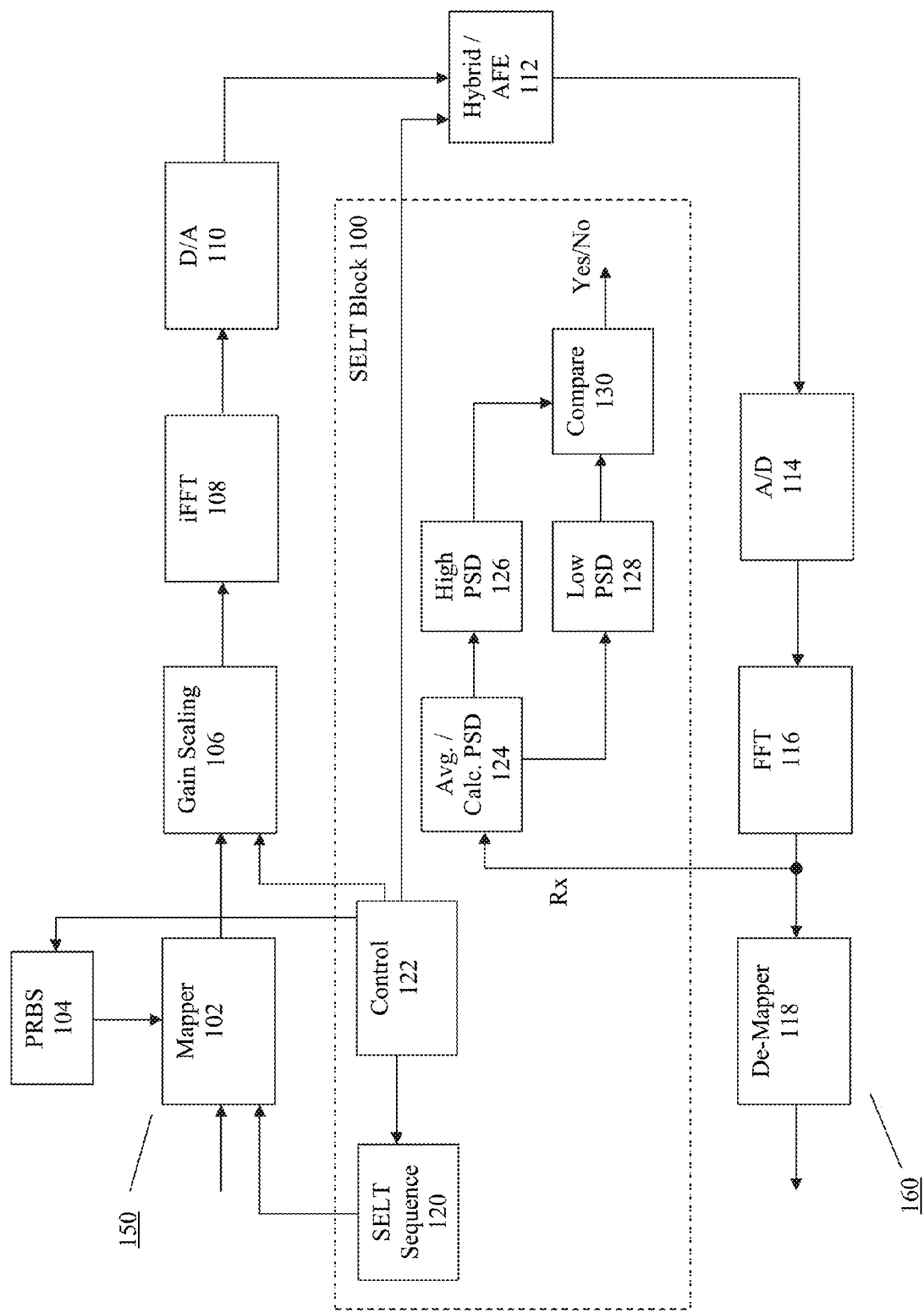
FIG. 1 is a block diagram illustrating an example SELT block in a CPE modem according to embodiments of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, embodiments of the invention relate to methods and apparatuses for detecting a missing micro-filter that can be implemented at a customer premises and which use probe signals that are designed to avoid interference with signals used in other lines of an xDSL system.

The present inventors recognize that some existing approaches to detecting a missing micro-filter employ a dual ended technique. A dual ended technique is one which requires that a modem or test device be connected to both ends of the connection. Examples are a regular DSL startup and Dual Ended Line Test (DELT). In these cases, during a DSL startup sequence, or during a DELT test, the transmit power level is varied between at least two levels and the received SNR is compared for each of the two levels. Since the distortion caused by an unfiltered telephone device is non-linear, the distortion will be significantly higher when the higher level transmit signal is sent, resulting in lower measured SNR. The existing approaches look for this change in the SNR of the received signal. Examples of these existing approaches include WO2006078682A2, EP2250801A1, and WO2013137850A1.

As can be readily seen, a disadvantage of these existing DELT approaches is that DSL equipment be connected to both ends of the line. This typically means that the test must be performed using a modem at the central office side (DSLAM) and a modem connected at the customer premises, which is burdensome. Moreover, in some cases, the missing micro-data filter degrades the connection so severely that a DSL connection cannot be established, i.e., the modems are not able to successfully train up. In this case a DELT technique to detect a missing microfilter cannot be used at all According to certain general aspects, therefore, embodiments of the invention detect a missing micro-filter using a SELT technique. The present inventors have determined that the use of SELT for this detection has several advantages over existing DELT techniques. For example, SELT does not require that DSL equipment be connected to both ends of the line, so the test can be performed from only one end of the loop. It should be noted that SELT tests are conventionally used to identify line impairments such as bridge taps, as well as perform other line characterizations. Some SELT techniques have even been applied to the related problem of detecting when a micro-filter has been improperly connected to a modem (see U.S. application Ser. No. 14/069,831, the contents of which are incorporated herein by reference).

During SELT, the test device transmits a probe signal and receives an echo of the transmitted signal. In embodiments, the invention transmits a signal in a portion of the available band and then analyzes the received echo in the remainder of that band that does not include the transmit signal, i.e., the out-of-band region. This test is performed at two different transmit PSD levels. The out-of-band energy is compared between the two levels. When the predominant noise source is distortion, the out-of-band energy will be appreciably higher when the transmit PSD is higher. The available band is defined herein as the entire useable DSL bandwidth of the test device or modem in which this technique is implemented.

Embodiments of the invention described herein could be implemented in a standalone test device or could be incorporated as part of a central office or customer premises (i.e. CPE) modem. In most situations it will be preferable to execute the missing micro-filter test from the customer premises end of the connection. This is because a relatively strong signal is required to detect distortion in telephone devices. If the probe signal were instead transmitted from the central office end, the loop attenuation would reduce the signal prior to reaching the in-home wiring. The test could therefore be conducted from the central office only when the loop length is quite short. Therefore, the discussion below will assume that the algorithm implemented in a customer premises modem or test device.

FIG. 1 is a block diagram illustrating an example SELT block 100 according to embodiments of the invention. As shown, block 100 is interposed between a transmit chain 150 and receive chain 160 of a xDSL modem. Embodiments of the invention can be implemented by xDSL modem chipsets and associated firmware such as a Vx185 platform and Insight software provided by Ikanos Communications. Those skilled in the art will understand how to implement the present invention by adapting these and other chipsets with the SELT functionality of the invention after being taught by the present examples.

It should be noted that typical xDSL modems include many additional components than shown in FIG. 1, including controllers and other processors that can interact with the components shown in FIG. 1 such as for initiating and performing SELT tests, collecting and storing or transmitting results, etc. Such components and functionalities are well known to those skilled in the art and so additional details thereof will be omitted here for sake of clarity of the invention.

As noted above, apparatuses according to embodiments of the invention are not limited to being incorporated in a xDSL modem as shown in FIG. 1. For example, embodiments of the invention can be incorporated in dedicated testing equipment, remote testing equipment, server side modems, etc.

As shown, block 100 according to embodiments of the invention includes a SELT sequence block 120 that causes mapper 102 to form symbols corresponding to SELT probe signals as will be described in more detail below. The symbols formed by mapper 102 are processed further by gain scaling block 106 to adjust the symbols to both shape the probe signals and control the total power on the line during the transmission of the probe signals of embodiments of the invention as will be described in more detail below. Control block 122 initiates the generation of symbols corresponding to the probe signals of the invention by SELT sequence block 120, and further controls the operations of gain scaling block 106 during SELT tests. As further shown, transmit chain 150 includes a PRBS block 104, which during typical operation is used to randomize the symbols formed by mapper 102. As will be described in more detail below, during SELT tests according to embodiments of the invention, control block 122 turns off PRBS block 104.

The adjusted symbols from gain scaling block 106 are converted to time domain by iFFT 108, converted to analog signals by A/D 110 and transmitted onto the tip/ring connection of the modem via hybrid 112. The reflections of the transmitted signals are simultaneously sensed via analog front end (AFE) 112, digitized by A/D 114 and converted to frequency domain by FFT 116. Instead of being converted to data by de-mapper 118, the reflected symbols (Rx) are provided to PSD averaging and calculator block 124. As will be explained in more detail below, a test methodology according to embodiments of the invention include sending a high PSD probe signal and a low PSD probe signal, the reflections of which are captured in high PSD block 126 and low PSD block 128 and compared to each other by block 130 to determine whether the line coupled to the modem contains a missing micro-filter.

Figure 2:
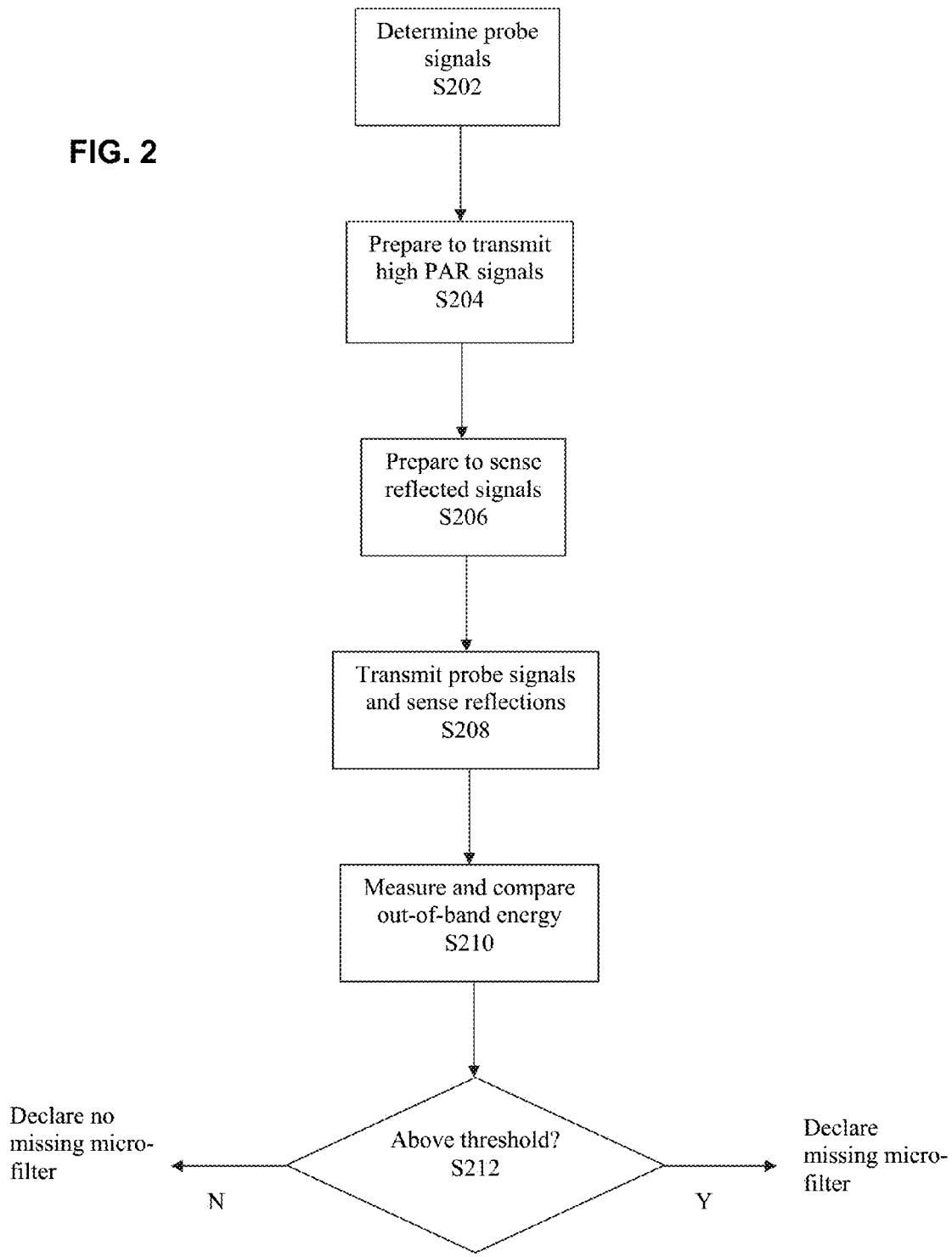
FIG. 2 is a flowchart illustrating an example test methodology according to embodiments of the invention.

An example methodology according to embodiments of the invention is shown in FIG. 2. This methodology will be described in connection with an operation of SELT block 100 described above, as well as by associated controllers and processors as will be appreciated by those skilled in the xDSL modem arts. However, as noted previously, the methodology of the invention is not limited to being performed by the example block shown in FIG. 1, but can be included in dedicated testing equipment, remote testing equipment, etc.

As shown in FIG. 2, a first step S202 is to determine the probe signals to use in the SELT tests according to embodiments of the invention. In this regard, one aspect of the technique according to embodiments of the invention is to minimize disturbance to other lines within the same cable bundle, especially when the system uses vectoring (i.e., crosstalk cancellation). Vectoring typically cancels Far End Cross Talk (FEXT) in both directions for lines within the same cable bundle. Because of vectoring, the overall noise floor of the DSL connection is significantly lower as compared to a non-vectored system. While a lower noise floor enables higher data rates, it also means that the connection is more susceptible to transient noise, such as impulse noise, or a brief burst of uncancelled crosstalk resulting from a SELT test being performed on other lines in the same bundle, such as the SELT tests of embodiments of the invention.

One potential solution to the problem would be to apply vectoring, or cross talk cancellation, to the line under test. Unfortunately, this is not feasible because it must be possible to run the missing micro-filter test even when there is no DSL equipment connected to the remote end of the line. Vectoring requires an end-to-end connection for all lines that are included in the cancellation.

Since vectoring cannot be performed on the line under test, the alternative is to transmit the probe signal at a low enough power spectral density (PSD) level such that there is minimal interference to other lines in the cable bundle. In this case "minimal interference" could mean that no FECs (Forward Error Corrections), or no CRCs (Cyclic Redundancy Checks), or no line drops, are caused on other lines by the probe signal of the invention. The appropriate definition will depend on the particular deployment and how tolerant the associated application is to these types of events.

For conventional SELT measurements such as loop length estimation, gauge detection, and bridge tap location, a wide band signal of up to 17 MHz with a very low transmit PSD level of −93 dBm/Hz is typically used. This PSD level is close to the out-of band limit mask for VDSL2 (−97 to −100 dBm/Hz). At this level there is no discernible impact on vectored lines. Unfortunately, at this level, distortion cannot be detected in typical telephone devices so a higher transmit PSD level must be used. Therefore, a tradeoff is required.

According to certain aspects, the present inventors have recognized that a higher PSD level can be used for the distortion measurement as long as the transmission band is carefully chosen. Because crosstalk increases with frequency, in general it is best to transmit the probe signal in a low frequency band. However, the peak voltage of the probe signal needs to be high enough to trigger distortion in a typical telephone device. Sending the probe signal over only a few DSL tones does not result in a high enough peak signal. The present inventors have discovered that when sending a low enough PSD level to minimize disturbance to other lines, it is necessary to spread the probe signal over hundreds of tones.

The present inventors have developed two probe signals for use in embodiments of the invention. Both of these signals include a component in the US0 band (tones 6 to 32). The use of US0 is beneficial because it is the lowest frequency VDSL band and crosstalk is minimized in this band. In addition, because crosstalk is low in this region, most vectoring systems do not cancel crosstalk in this band. Therefore the transmission of the probe signal in the US0 band will not be noticeable to other lines in the same bundle.

In embodiments, the probe signal consists of a periodic VDSL2 O-P-Training signal, where each tone is modulated with fixed phase 4-QAM, with symbols gain adjusted as explained in more detail below.

It would be ideal in some circumstances if transmission in the VDSL2 US0 band alone were sufficient for detecting distortion. Unfortunately, even sending all US0 tones (i.e., U32, tones 6 to 32) at the maximum level of the PSD limit mask in the US0 band (i.e. −35 dBm/Hz) does not create a high enough peak voltage to trigger distortion because there are too few tones. Therefore, a second component is needed. Selection of the second component is also based on crosstalk considerations. Two types of crosstalk must be considered, Near End Crosstalk (NEXT) and FEXT. NEXT is crosstalk which originates from other transmitters at the local end of cable bundle, while FEXT originates from transmitters at the remote end of cable bundle.

All VDSL deployments and most ADSL deployments use non-overlapping frequency bands for the upstream (from the customer premises to the central office, i.e. US) and downstream (from the central office to the customer premises, i.e. DS) transmission directions. The specific frequencies occupied by the upstream and downstream bands are defined in the various DSL standards. Because the bands are non-overlapping, NEXT crosstalk is generally not a significant problem during normal modem operation since the frequency of the NEXT interference is out of band for the receiver. For this reason, vectoring systems typically only cancel FEXT which is within the frequency band of the receiver.

Since the probe signal used to detect distortion is not transmitted during normal operation, this signal could in theory occupy any suitable set of frequency bands. In other words, the probe signal could be sent in the upstream bands, the downstream bands, or a combination of the two. In embodiments where the detection method of the invention is executed from the CPE, if the second probe signal component is transmitted in an US band, the NEXT for other CPE victim receivers will be out-of band and the FEXT for CO victim receivers will be in-band, so that only the FEXT at the CO will be of consequence. On the other hand, if the second probe signal component is sent in a DS band, the NEXT will be in-band for CPE victim receivers and the FEXT will be out-of-band for the CO victim receivers.

The present inventors further recognize that there are differences in the way in which the received Signal to Noise Ratio (i.e. SNR) due to NEXT and the received SNR due to FEXT vary as a function of loop length and frequency. These differences cause the SNR to be more affected by FEXT at short loop lengths while it is more affected by NEXT at longer loop lengths. For these reasons, it is preferable to transmit the probe signal in the NEXT bands when the loop length is relatively short and in the FEXT bands when the loop length is longer. For a customer premises device, the NEXT bands correspond to the downstream bands and the FEXT band corresponds to the upstream bands. The opposite is true for a central office device. Furthermore, when transmitting in the NEXT bands, it is preferable to keep the frequency of the signal as low as possible since NEXT increases as a function of frequency.

The PSD characteristics of the two probe signals PS1 and PS2 in example embodiments of the invention, both of which are sent at two different transmit PSD levels, are listed in the Table 1 below. The specific tone numbers for the transmit and monitor bands are given in Table 2.

TABLE 1

Probe Signal PSD Characteristics

| Probe Signal | $1^{st}$ band | $1^{st}$ band Tx PSD (dBm/Hz) | $2^{nd}$ band | $2^{nd}$ band Tx PSD (dBm/Hz) |
|---|---|---|---|---|
| PS1 - low PSD | US0 | −83 | low half of DS1 | −103 |
| PS1 - high PSD | US0 | −49 | low half of DS1 | −69 |
| PS2 - low PSD | US0 | −83 | US1 | −103 |
| PS2 - high PSD | US0 | −49 | US1 | −69 |

TABLE 2

Probe Signal and Monitor Band Tone Usage
(tone freq. = tone no. * 4312.5 KHz)

| Probe Signal | $1^{st}$ signal band | 2nd signal band | $1^{st}$ monitor band | 2nd monitor band |
|---|---|---|---|---|
| PS1 | 6-32 | 82-450 | 33-81 | 452-1205 |
| PS2 | 6-32 | 810-1205 | 33-869 | 33-869 |

In embodiments of the invention, in step S202 control block 122 selects PS1 as the probe signal at short loop lengths and PS2 and longer loop lengths. In one non-limiting example, the cutoff between "short" and "long" is 1200 ft. The cross-over point for making the decision of which probe signal to send based on loop length can be determined empirically, and programmed into the CPE modem.

Note the US0 portion of the signal is transmitted 20 dB hotter than the second component. This is possible due to the lower crosstalk in the US0 band. Note further that for the PS1 signal in these example embodiments, there is a 50 tone gap between US0 and the beginning of the DS1 transmit band. This is to provide a low frequency monitor band since distortion tends to be stronger at low frequencies. For the PS2 signal, the entire DS1 band is a monitor band.

Figure 3:
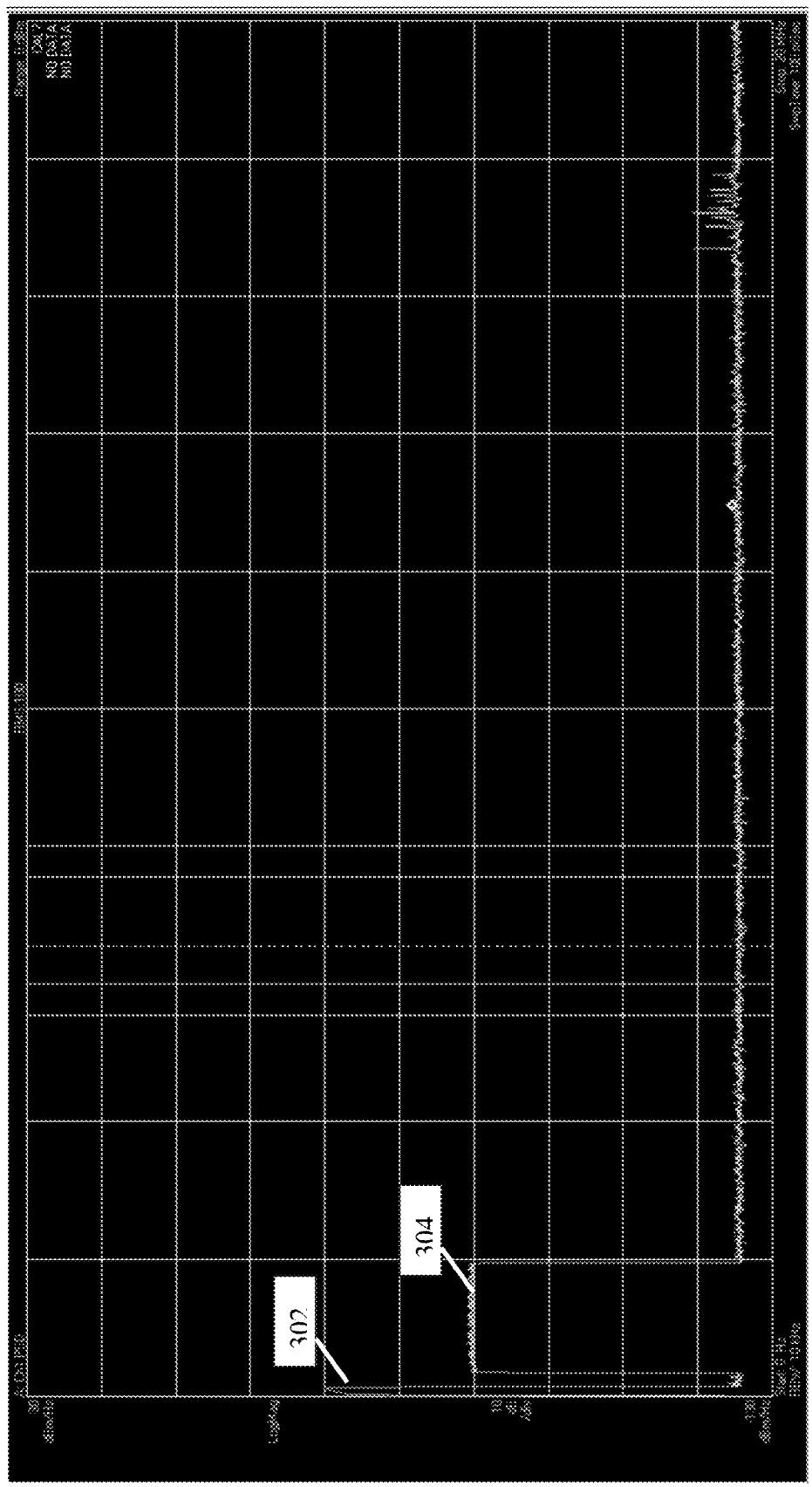
FIGS. 3 and 4 illustrate the probe signal transmit PSDs for the higher PSD signal used in example embodiments of the invention.
Figure 4:
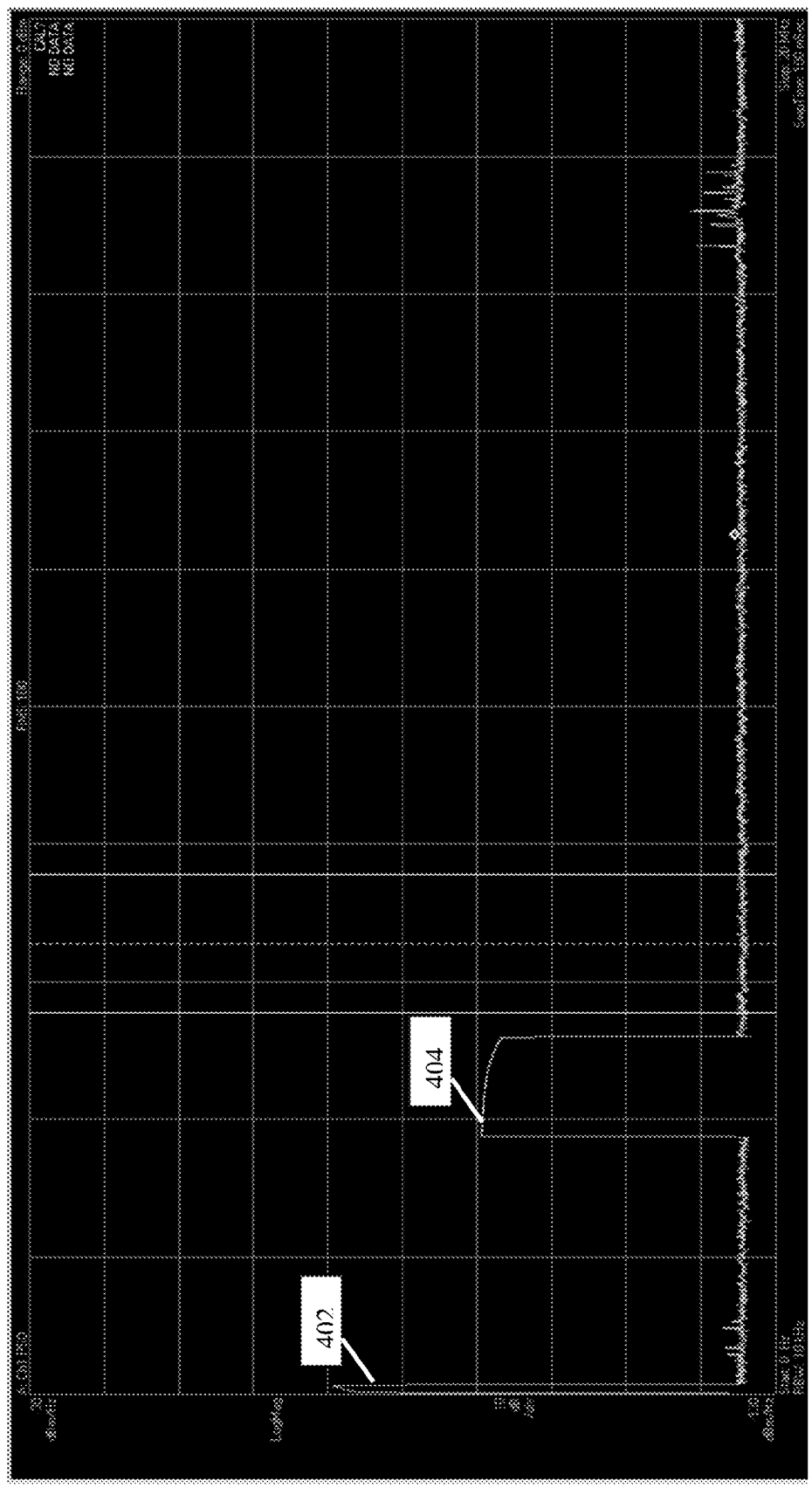

FIGS. 3 and 4 are frequency domain plots illustrating the high PSD versions of the transmitted probe signals PS1 and PS2, respectively, according to example embodiments of the invention. The high transmit amplitudes in the first (302, 402) and second (304, 404) signal bands of the probe signals can be clearly seen, with the remaining tones outside the first and second signal bands being substantially zero.

Prior to running the missing micro-filter test according to embodiments of the invention, SELT block 100 can determine the loop length in one of two ways. One method is to run a standard SELT test for the purpose of analyzing the in-home wiring. As set forth above, SELT is conventionally used to uncover wiring problems, such as open circuits or bridge taps, and to determine the loop length. For this purpose, a relatively wide band signal, using as much as the available VDSL bandwidth as possible, is required in order to obtain good resolution in the time domain response. When a wide band signal is used (e.g., 12 MHz or 17 MHz), then the transmit PSD level must be kept quite low to avoid disturbing other vectored lines in the same cable (see e.g. U.S. application Ser. No. 14/339,862, the contents of which are incorporated herein by reference). This low signal level is typically too low to detect distortion from a telephone device. Fortunately, a narrower bandwidth SELT signal can be used to detect distortion.

When the missing micro-filter test of embodiments of the invention is implemented as part of a CPE modem, another way is to use the loop estimate obtained during the last startup. This can work for cases where there is a central office modem connected and provided that the modem has previously entered Showtime at least once while connected to the loop. In this regard, it should be noted that the VDSL standard specifies that the electrical loop length (kl0) be determined during the startup sequence and reported to the CPE modem.

As shown in FIG. 2, a next step S204 in example methods according to embodiments of the invention includes preparing the CPE modem's transmit path 150 to transmit a high peak-to-average ratio (PAR) signal.

In connection with this step, the present inventors recognize that since the ability to generate and detect non-linear distortion depends on the peak voltage of the probe signal, one way to maximize the ability to detect distortion while minimizing crosstalk is to use a signal with a large PAR value. A large PAR signal will have a higher peak voltage for a given power level. The PAR value of a DSL signal can be controlled by adjusting the phase of the individual tones. Normally, when the signal is modulated with random data, controlling the phase and therefore the PAR value is difficult.

However, in the case of the probe signal used to detect distortion, the opposite goal exists, i.e., to maximize the PAR value. Since there is no user data modulation during SELT, block 100 is free to choose the phase of all of the tones, so maximizing the PAR is quite easy. The only constraint is that the peak signal should be kept within the D/A converter operating range. When transmitting well below the peak level of the system as in embodiments of the invention, this will not be a problem. Since the probe signal will be periodic and deterministic, the exact peak voltage can be determined.

As set forth above, normally when transmitting a DSL signal, the signal is scrambled by PRBS block 104. One purpose of the scrambler is to randomize the phase of each tone which minimizes the chance of the tones adding coherently, which in turn minimizes the chance of a large peak voltage. According to embodiments of the invention, however, step S204 includes control block 122 causing the scrambler to be disabled while sending the periodic O-P-Training signal of the invention. This causes all tones within the probe signal to have the same phase so that the peaks add constructively.

Figure 5:
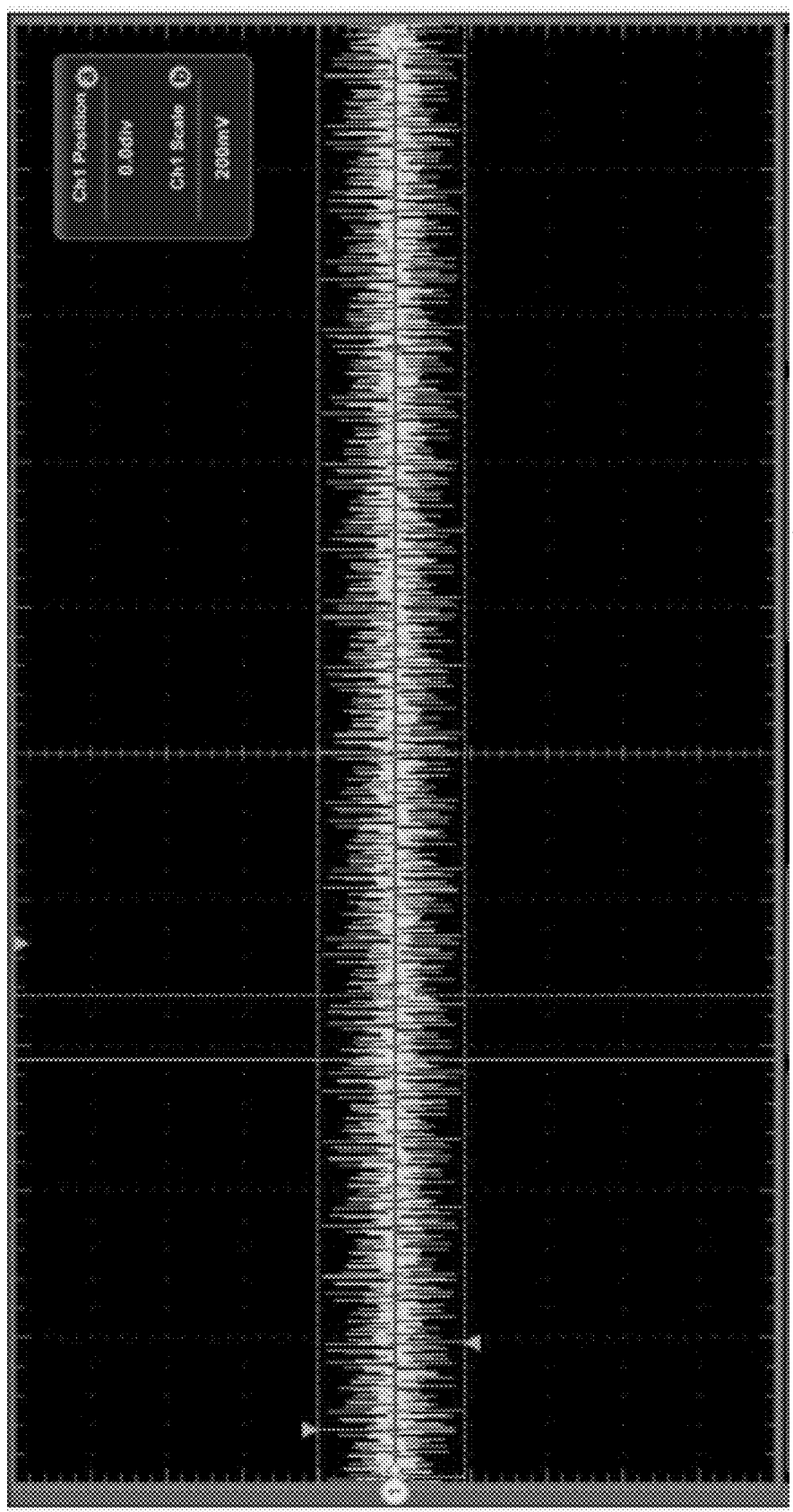
FIG. 5 shows the waveform of the O-P-Training signal when the scrambler is enabled.
Figure 6:
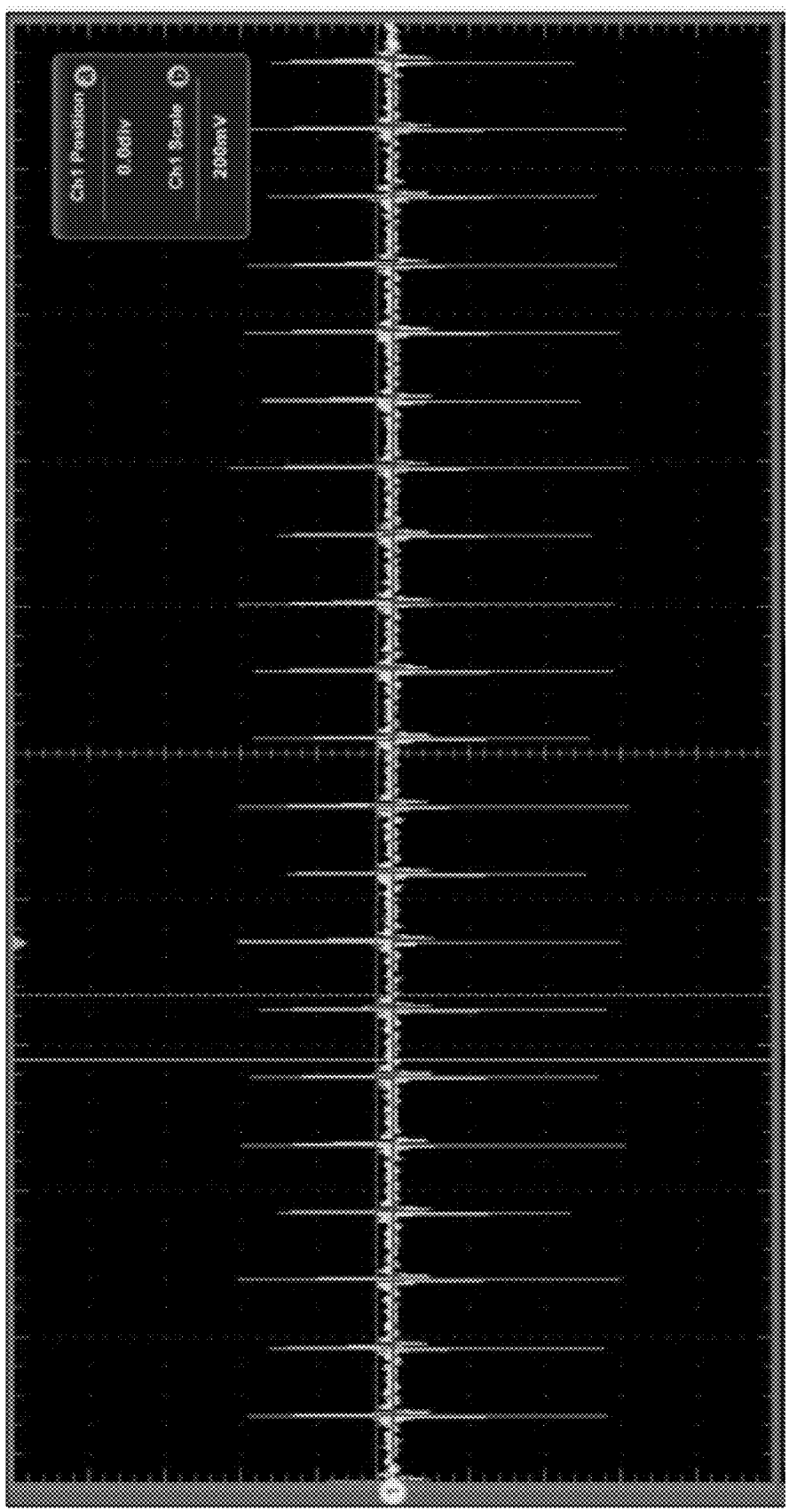
FIG. 6 shows the O-P-Training signal when the scrambler is disabled.

FIG. 5 shows the time domain waveform of the O-P-Training signal when the scrambler is enabled. The signal looks a lot like noise, as is the case for a typical DSL signal. FIG. 6 shows the O-P-Training signal when the scrambler is disabled. This signal looks like a pulse occurring at the symbol rate (4.3125 KHz). Table 3 gives the peak-to-average ratio for both waveforms using the peak-to-peak and RMS voltage values in one example measurement.

As can be seen in Table 3, the power, PSD, and RMS voltage is the same for both signals. However, the probe signal has a PAR and therefore a peak voltage which is 8.7 dB higher. In practice, this allows actually lowering the transmit PSD by about 6 dB, relative to a standard PAR signal, to achieve the same level of distortion detection reliability.

TABLE 3

PAR Values for a Typical DSL Signal and the Present Probe Signal

| Signal | Volts Peak-to-peak (mv) | Volts RMS (mv) | PAR (linear) | PAR (dB) |
|---|---|---|---|---|
| O-P-Training with scrambler enabled | 388 | 43 | 4.5 | 21.7 |
| O-P-Training with scrambler disabled (probe signal) | 1048 | 43 | 12.2 | 13 |

A next step S206 in example methods of embodiments of the invention includes preparing the CPE modem to sense the reflection of the transmitted probe signal. In embodiments, this step includes control block 122 setting the AGC in hybrid/AFE 112 to its lowest setting (e.g. −18 dB in example CPE modems).

Next, in step S208, the probe signals selected in step S202 (i.e. either PS1 or PS2) are transmitted on the tip/ring connection of the modem via hybrid block 112 and their reflections are simultaneously sensed via AFE 112. In example embodiments, this step S208 includes controller 122 causing SELT sequence block 120 to input cause mapper 102 to form symbols of an O-P-Training signal at the VDSL2 symbol rate (e.g. 4.3125 KHz) for two separate ten second periods. In the first ten second transmit period, control block 122 further causes gain scaling block 106 to adjust the tones of the symbols formed by block 102 so that the signal to be transmitted has the high PSD version of the selected signal (i.e. either PS1 or PS2) as specified above in Tables 1 and 2. As the adjusted symbols are transmitted, the reflected signal is sensed on receive path 160, and the frequency domain data corresponding to the reflected signal is received by block 124. The data from FFT 116 is accumulated over the first ten second period and the average values are buffered in block 126. In the second ten second transmit period, control block 122 further causes gain scaling block 106 to adjust the tones of the symbols formed by block 102 so that the signal to be transmitted has the low PSD version of the selected signal (i.e. either PS1 or PS2) as specified above in Tables 1 and 2. As the adjusted symbols are transmitted, the reflected signal is sensed on receive path 160, and the frequency domain data corresponding to the reflected signal is received by block 124. The data from FFT 116 is accumulated over the second ten second period and the average values are buffered in block 128.

After the frequency domain data corresponding to the reflections of the high and low PSD probe signals has been accumulated in blocks 126 and 128, a next step S210 includes comparing the out-of-band energy in the two signals. As set forth above, this includes measuring a difference between the spectral energy in the monitor band(s), which is tones 33-81 and tones 452-1205 for the PS1 probe signal, and tones 33-869 for the PS2 probe signal.

Next, in step S212, the measured difference is compared to a threshold and a missing micro-filter is declared or not depending on the result. For example, the threshold can specify both a minimum amount of distortion present in a monitored tone (e.g. a minimum dB level in the difference PSD at the monitored tone), and the minimum number of monitored tones that are distorted. Those skilled in the art will understand that there can be many other types of thresholds.

To assist in understanding aspects of the invention, FIGS. 7 to 11 are graphs illustrating example received data using the methods of embodiments of the invention.

Figure 7:
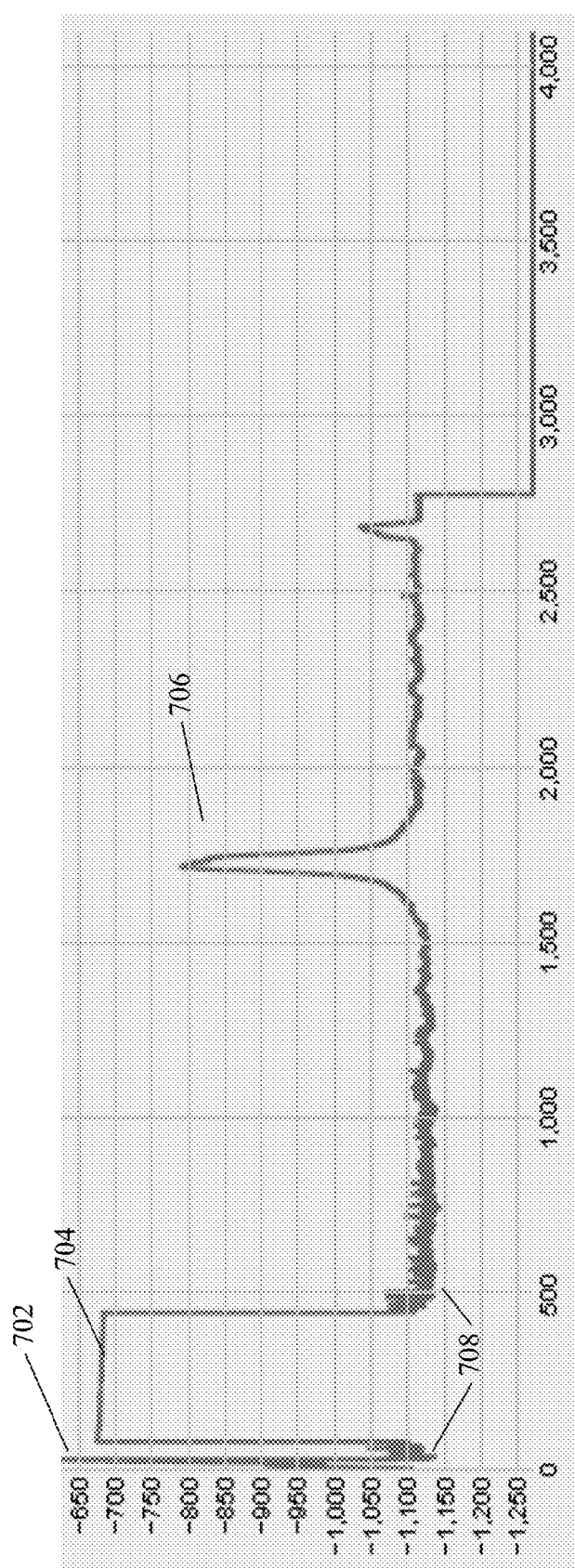
FIG. 7 shows the received PSD from the higher transmit PSD test using the PS1 probe signal with no added distortion present, i.e., no phone connected, in embodiments of the invention.

FIG. 7 shows an example received PSD from the high PSD version of the PS1 probe signal with no added distortion present, i.e., no phone connected. As can be seen, the received PSD 702 in the US0 band is about −49 dBm/Hz, and the received PSD 704 in the DS1 band is about −69 dBm/Hz. The amplitude scale is in 0.1 dBm/Hz. Note that there is an extraneous peak 706 in the PSD response at around tone 1700. This is an artifact from the AFE, and can be ignored for purposes of the present invention. For the PS1 probe signal, the monitor band 708 is tones 33 to 81 and tones 452 to 1205. It can be initially seen from FIG. 7 that the PSD in the monitor band region is low and is below −110 dBm/Hz, indicating that no external distortion is present.

Figure 8:
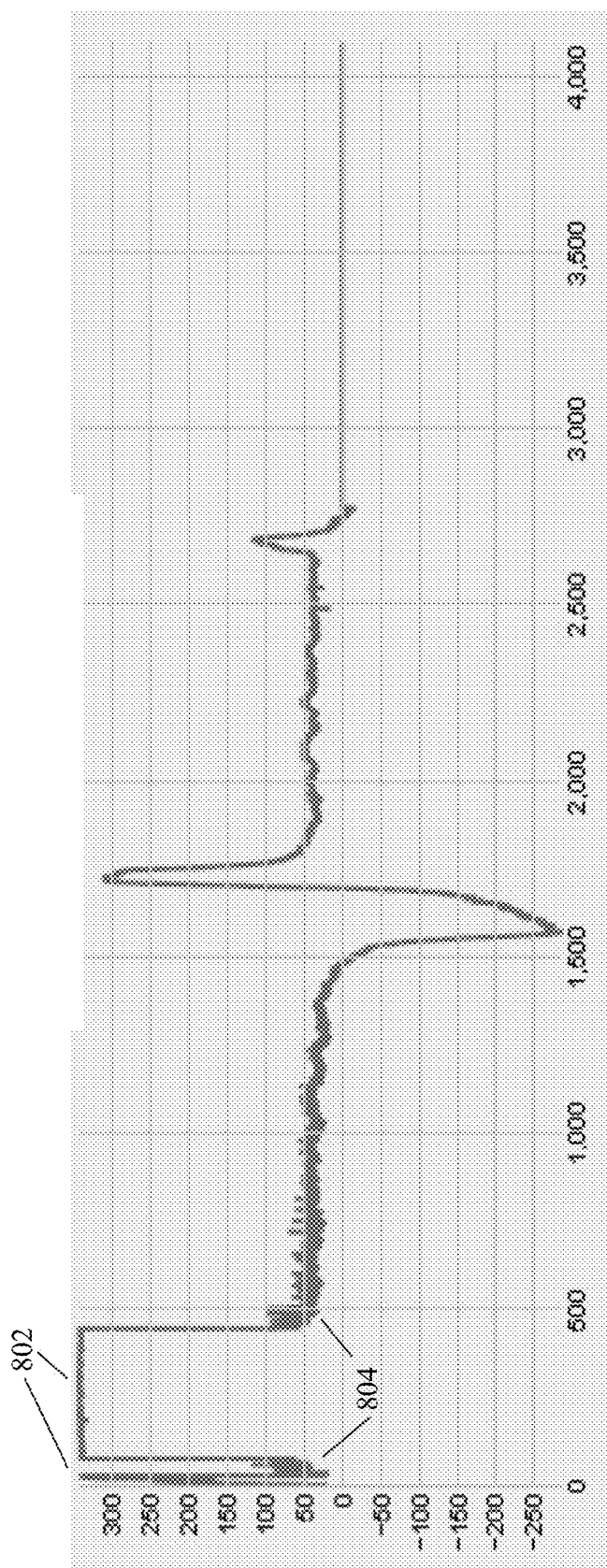
FIG. 8 shows the received PSD difference for the same test in FIG. 7 according to embodiments of the invention.

FIG. 8 shows an example received PSD difference for the same test performed in connection with FIG. 7 using the PS1 probe signal. This is the difference between the received PSD for the transmission of the high PSD version of the PS1 signal and the received PSD for the transmission of the low PSD version of the PS1 signal. The PSD difference in the signal band 802 is about 34 dB, which is the expected difference between the low and high transmit PSD levels. The difference in the monitor band 804 (tones 32 to 81 and 870 to 1203) is about 5 dB. This is due to the fact that the AFE noise floor increases slightly with transmit level, and is below the threshold indicating distortion.

Figure 9:
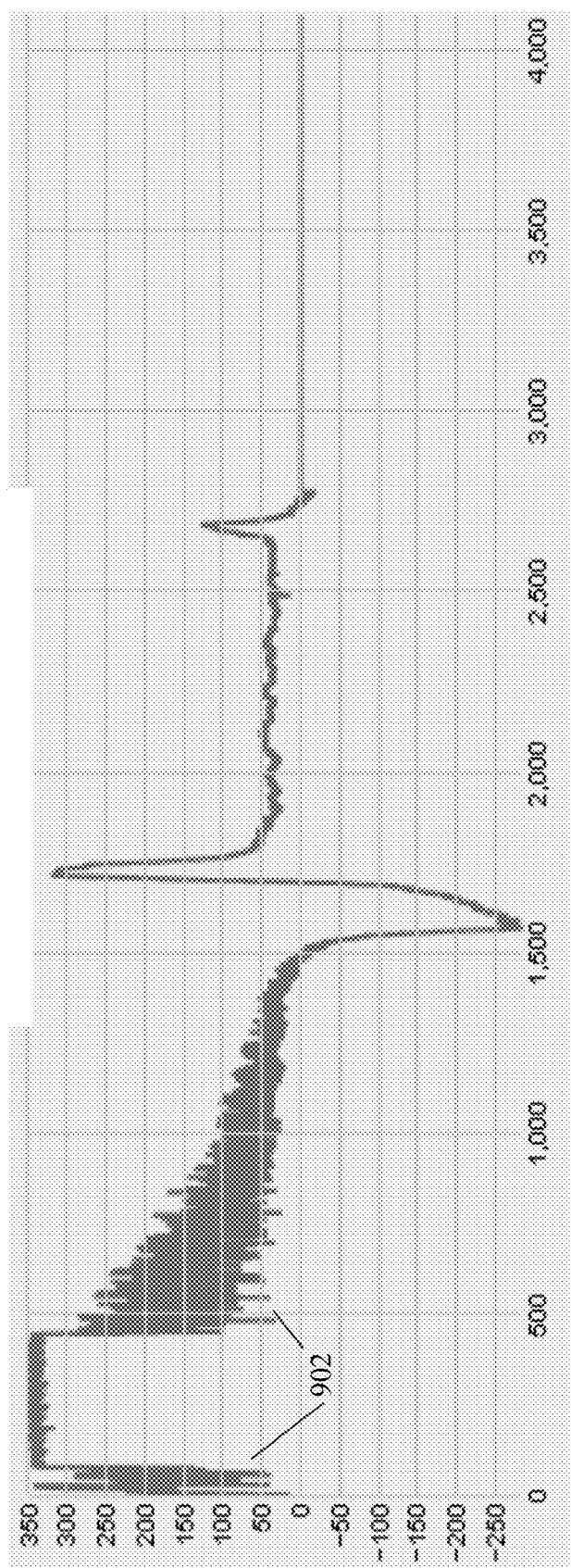
FIG. 9 shows the received PSD difference for the PS1 probe signal with a phone connected without a filter in embodiments of the invention.

FIG. 9 shows the received PSD difference for the PS1 probe signal in an example where a phone is connected without a filter to a twisted pair to which the modem is also connected. In this case, strong distortion is observed. In particular, the PSD difference, corresponding to the distortion, is as high as 28 dB in the monitor band 902. In addition, the PSD difference exceeds 10 dB across nearly the entire monitor band 902 (i.e. up to tone 1205).

Figure 10:
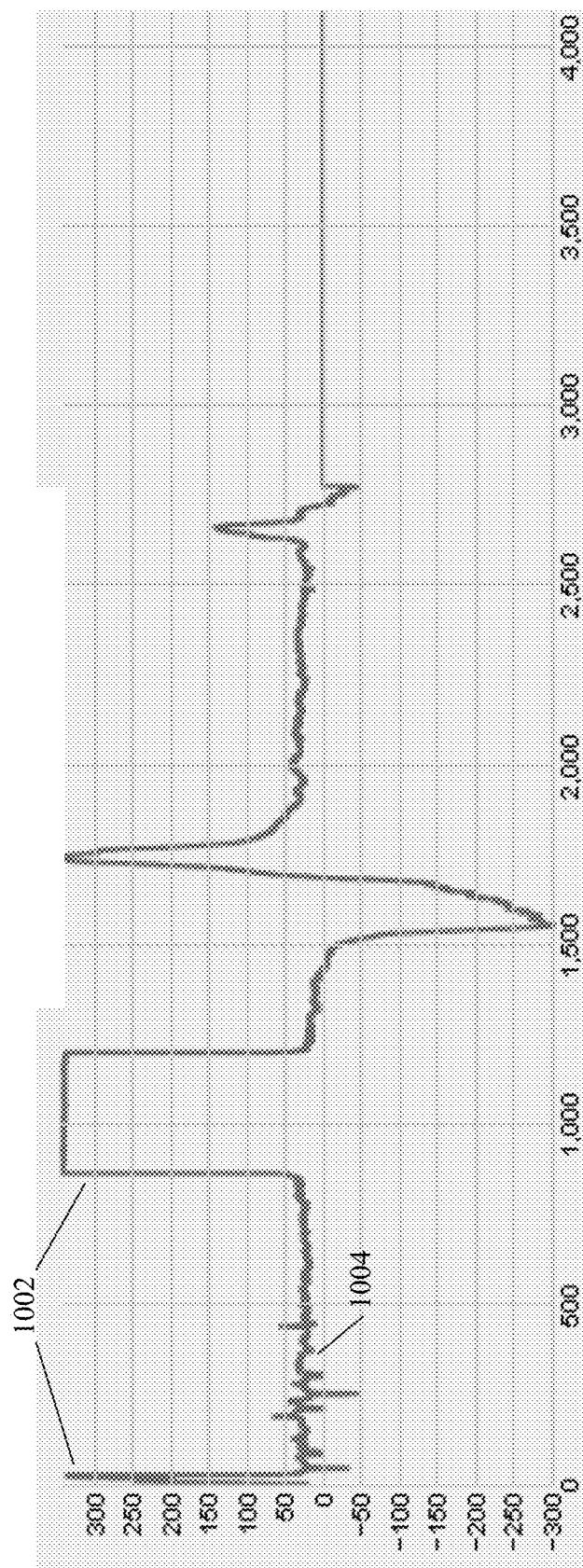
FIG. 10 shows the PSD difference for the PS2 probe signal with no added distortion in embodiments of the invention.

FIG. 10 shows an example received PSD difference for the PS2 probe signal with no added distortion. Again the difference in the signal band 1002 is around 34 dB and is less than 5 dB in the monitor band 1004 (tones 32 to 869).

Figure 11:
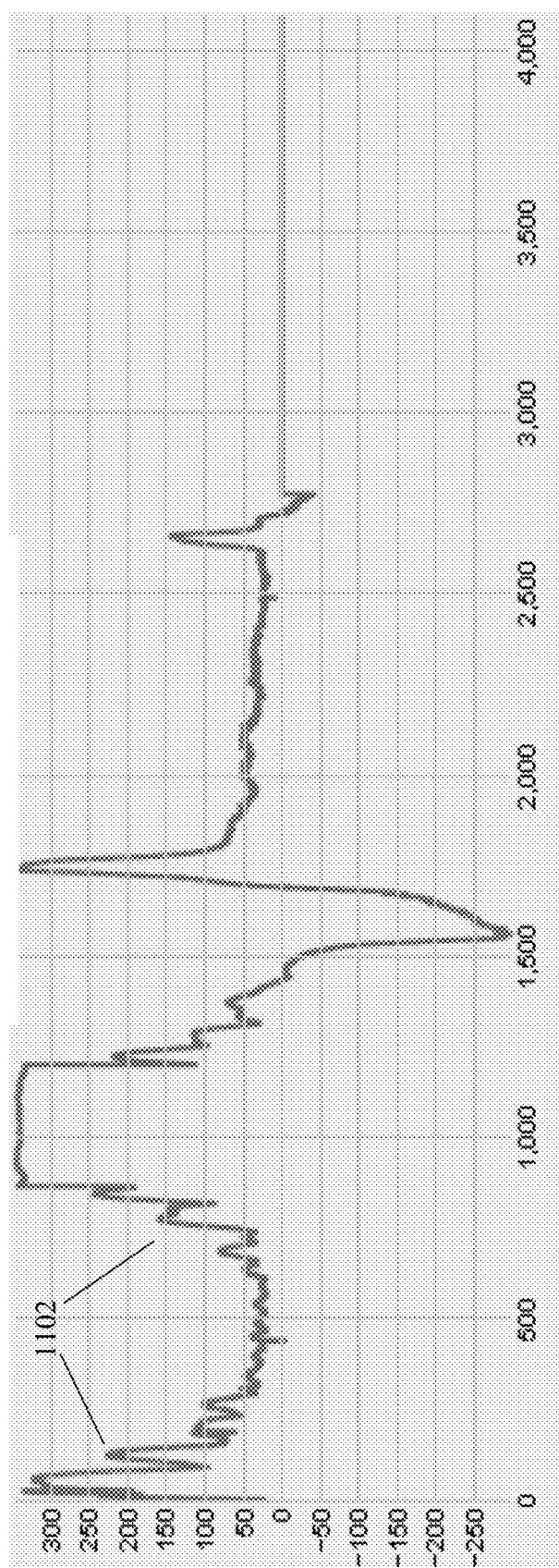
FIG. 11 shows the PSD difference for the PS2 probe signal with distortion in embodiments of the invention.

FIG. 11 shows an example PSD difference for the PS2 probe signal with distortion. In this case, the distortion in the monitor band 1102 is up to 30 dB, although fewer tones cross the 10 dB threshold as compared to the previous example.

It should be apparent from the above that a threshold for declaring a missing micro-filter can be determined based on experiments and programmed into the SELT block 100. It should be further apparent that as the bands of the transmit signals PS1 and PS2 are different, the thresholds can be different for the PS1 and PS2 probe signals.

As set forth above, one problem associated with missing micro-filters is that for most types of phones, the amount of distortion generated depends on the state of the phone, i.e., whether the telephone device is on-hook or off-hook. Most typically, the distortion is highest when the phone is off-hook, although there are some phones where the opposite is true. The problem is that at the time a SELT test is performed, a phone which has a missing filter might not be in its high distortion state and therefore the distortion might not be detectable.

If a phone with a missing filter switches to its high distortion state (i.e., changes its on-hook-off-hook status) while the DSL connection is in data mode, in many cases the increased distortion or change in echo will degrade the SNR to the point that the connection is dropped due to a high CRC error rate. When this occurs, it is a normal procedure for the modem to automatically attempt to reestablish the connection by performing a retrain.

According to additional or alternative embodiments, once the connection is dropped, the CPE modem can automatically initiate a missing micro-filter test according to the invention prior to the start of the retrain sequence. The result of the test can be stored by the modem and then reported once the DSL connection is back up. This way it will be possible to determine if the line drop was caused by a missing micro-filter.

In some instances, the distortion caused by the unfiltered phone is so great that the modem is not able to successfully startup as long as the phone is in its high distortion state. In these cases, the DSL connection will resume once the phone has returned to its lower distortion state, at which time the cause of the problem will be reported.

Figure 12:
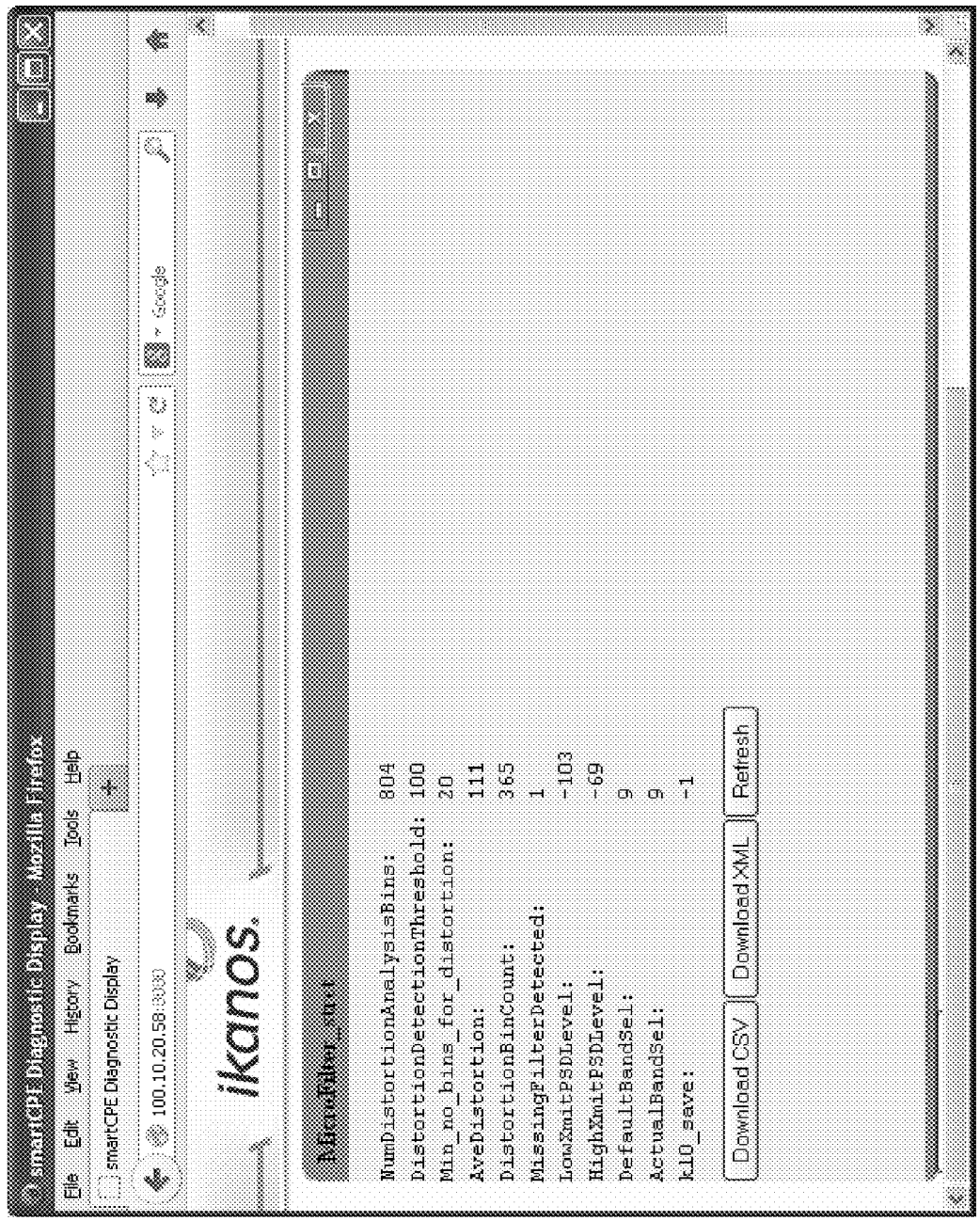
FIG. 12 shows an example web page window which displays input and output parameters associated with missing filter detection according to embodiments of the invention.

As set forth above, embodiments of the invention can be incorporated in a DSL modem and associated firmware that can interact with a user having a computer and a web browser such as Windows Internet Explorer. FIG. 12 shows an example web page window which displays input and output parameters associated with a missing micro-filter detection method according to embodiments of the invention. As can be seen in this example, the number of tones monitored for distortion is 804. For each analyzed tone, if the distortion is greater than 100, that tone is considered a distorted tone. In this example, 20 is the minimum number of distorted tones upon which a missing micro-filter is declared. In this particular example in FIG. 12, 365 tones were considered distorted and a case of missing micro-filter was declared.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method to detect a missing micro-data filter, comprising:
   selecting a probe signal having a transmit signal band and at least one separate monitor band;
   performing a single-ended line test (SELT) by transmitting the probe signal on a line and simultaneously measuring a reflection of the transmitted probe signal;
   calculating distortion in the at least one monitor band, wherein calculating distortion comprises measuring the spectral energy in the at least one monitor band; and
   declaring a missing micro-filter based on the calculated distortion.

2. The method of claim 1, wherein the probe signal has PSD levels in the transmit signal band that cause minimal impact on vectored lines within the same cable as the line.

3. The method of claim 1, wherein selecting the probe signal is based on a loop length of the line.

4. The method of claim 3, further comprising determining the loop length by performing another SELT test.

5. The method of claim 3, further comprising determining the loop length by obtaining a stored value of loop length from a previous DSL startup sequence.

6. The method of claim 1, wherein selecting the probe signal includes selecting the transmit signal band and a PSD level in the transmit signal band.

7. The method of claim 1, further comprising:
   detecting a line drop; and
   automatically initiating the selecting, performing, calculating and declaring steps following the line drop to determine if the line drop was caused by a missing micro-data filter.

8. A single-ended line test (SELT) apparatus, comprising:
   a control block that selects a probe signal having a transmit signal band and at least one separate monitor band;
   a SELT sequence block that initiates a symbol sequence for transmitting the probe signal on a line;
   a line coupled to a receive path for simultaneously measuring a reflection of the transmitted probe signal;
   a calculation block that calculates distortion in the at least one monitor band, wherein calculating distortion comprises measuring the spectral energy in the at least one monitor band; and
   a compare block that declares a missing micro-filter based on the calculated distortion.

9. The apparatus of claim 8, wherein the probe signal has PSD levels in the transmit signal band that cause minimal impact on vectored lines within the same cable as the line.

10. The apparatus of claim 8, wherein the probe signal is selected based on a loop length of the line.

11. The apparatus of claim 10, wherein the control block determines the loop length by performing another SELT test.

12. The apparatus of claim 10, wherein the control block determines the loop length by obtaining a stored value of loop length from a previous DSL startup sequence.

13. The apparatus of claim 8, wherein the probe signal is selected by selecting the transmit signal band and a PSD level in the transmit signal band.

\* \* \* \* \*